United States Patent
Kraggerud

(10) Patent No.: US 9,867,323 B2
(45) Date of Patent: Jan. 16, 2018

(54) DEVICE FOR AUTOMATIC ADJUSTMENT OF THE WORKING WIDTH OF A FIRST PLOUGH BODY IN ACCORDANCE WITH SUBSEQUENT PLOUGH BODIES' VARIABLE WORKING WIDTH

(71) Applicant: KVERNELAND GROUP OPERATIONS NORWAY AS, Kvernaland (NO)

(72) Inventor: Per Gunnar Kraggerud, Kvernaland (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 76 days.

(21) Appl. No.: 14/897,860

(22) PCT Filed: Jun. 11, 2014

(86) PCT No.: PCT/NO2014/050098
§ 371 (c)(1),
(2) Date: Dec. 11, 2015

(87) PCT Pub. No.: WO2014/204317
PCT Pub. Date: Dec. 24, 2014

(65) Prior Publication Data
US 2016/0120094 A1   May 5, 2016

(30) Foreign Application Priority Data
Jun. 17, 2013 (NO) .................................. 20130836

(51) Int. Cl.
*A01B 63/00* (2006.01)
*A01B 15/14* (2006.01)
(Continued)

(52) U.S. Cl.
CPC ............ *A01B 63/004* (2013.01); *A01B 15/14* (2013.01); *A01B 15/145* (2013.01);
(Continued)

(58) Field of Classification Search
CPC ....... A01B 63/004; A01B 3/464; A01B 15/14; A01B 15/145; F15B 11/205; F15B 7/00; F15B 2211/7057; F15B 2211/7121
See application file for complete search history.

(56) References Cited

U.S. PATENT DOCUMENTS 3,869,861 A * 3/1975 Case .................... A01D 41/145
267/64.11
4,093,248 A * 6/1978 Gassner ................ A01B 3/464
172/2

(Continued)

FOREIGN PATENT DOCUMENTS

DE    26 58 393 A1   6/1978
DE    3824787 A1    2/1990
(Continued)

OTHER PUBLICATIONS

Chinese Office Action and English translation, dated Jul. 6, 2016, 12 pages.
Norwegian Search Report, dated Jan. 10, 2014, 2 pages.

*Primary Examiner* — Jamie L McGowan
(74) *Attorney, Agent, or Firm* — Foley & Lardner LLP

(57) ABSTRACT

A device for automatically adjusting the working width of the first plough body of a plough in accordance with the variable working width of subsequent plough bodies. A first hydraulic cylinder displaces a rear frame section laterally. A second hydraulic cylinder pivots the rear frame section to adjust a transverse spacing of the plough bodies. The first hydraulic cylinder includes a multi-stage cylinder. A first cylinder stage forms a main lateral control, and a second cylinder stage forms an automatic working-width control for (Continued)

the first plough body. The second cylinder stage is in hydraulic-fluid communication with the second hydraulic cylinder in a master-slave configuration. The second cylinder stage is master or the slave depending on a moving direction of the cylinder stage and the second hydraulic cylinder being slave or the master. Piston diameters are matched to provide a correction of a lateral displacement of the front frame section.

5 Claims, 2 Drawing Sheets

(51) Int. Cl.
  *F15B 11/20*  (2006.01)
  *F15B 7/00*  (2006.01)
  *A01B 3/46*  (2006.01)

(52) U.S. Cl.
  CPC ............. *F15B 11/205* (2013.01); *A01B 3/464* (2013.01); *F15B 7/00* (2013.01); *F15B 2211/7057* (2013.01); *F15B 2211/7121* (2013.01)

(56) References Cited

U.S. PATENT DOCUMENTS

| | | | | |
|---|---|---|---|---|
| 4,186,806 | A * | 2/1980 | Ward | A01B 3/46 172/283 |
| 4,230,024 | A * | 10/1980 | Becker | F15B 15/24 91/396 |
| 4,415,040 | A * | 11/1983 | Salva | A01B 3/421 172/225 |
| 4,646,849 | A | 3/1987 | Watvedt | |
| 4,778,013 | A * | 10/1988 | Van der Lely | A01B 15/145 172/225 |
| 5,381,866 | A * | 1/1995 | Mong | A01B 3/466 172/219 |
| 5,410,946 | A * | 5/1995 | Hoshi | B21D 24/14 100/269.06 |
| 5,685,378 | A * | 11/1997 | Mong | A01B 3/466 172/204 |
| 6,116,351 | A * | 9/2000 | Stangeland | A01B 3/466 172/204 |
| 8,813,863 | B2 * | 8/2014 | Toublanc | A01B 3/464 172/290 |
| 2012/0255432 | A1* | 10/2012 | Harper | F15B 15/16 91/405 |
| 2012/0292059 | A1* | 11/2012 | Toublanc | A01B 3/464 172/477 |
| 2013/0056234 | A1* | 3/2013 | Meurs | A01B 3/464 172/446 |
| 2015/0322975 | A1* | 11/2015 | Kaufman | F15B 13/07 414/517 |

FOREIGN PATENT DOCUMENTS

| | | |
|---|---|---|
| DE | 42 16 385 A1 | 1/1993 |
| DE | 689 19 954 T2 | 8/1995 |
| DE | 10 2004 025 522 A1 | 12/2005 |
| DE | 10 2007 037 258 A1 | 2/2009 |
| DE | 20 2011 101 162 U1 | 10/2012 |
| DE | 10 2004 025 522 B4 | 2/2014 |
| EP | 0 358 537 A2 | 3/1990 |
| EP | 0 904 680 A1 | 3/1999 |
| EP | 1 151 648 A2 | 11/2001 |
| EP | 2 659 758 A1 | 11/2013 |
| FR | 2 799 340 A1 | 4/2001 |
| FR | 2975564 A1 | 11/2012 |
| GB | 1022491 A | 3/1966 |

* cited by examiner

DEVICE FOR AUTOMATIC ADJUSTMENT OF THE WORKING WIDTH OF A FIRST PLOUGH BODY IN ACCORDANCE WITH SUBSEQUENT PLOUGH BODIES' VARIABLE WORKING WIDTH

A device for automatically adjusting the working width of a first plough body of a plough in accordance with the variable working width of subsequent plough bodies is described, in which a first hydraulic cylinder is arranged to move a rear frame section sideways relative to a front frame section, and a second hydraulic cylinder is arranged to pivot the rear frame section around a first vertical pivoting axis in order thereby to adjust a transverse spacing of the plough bodies by the plough bodies pivoting around second vertical pivoting axes.

BACKGROUND

On ploughs mounted on the three-point linkage there is generally a need to displace the working members themselves, that is to say the plough bodies with associated beams and so on, laterally relative to the tractor to achieve the correct distance between the inside of the tractor wheel that is rolling in the furrow behind the previous strip of inverted soil and the landside of the first plough body. The lateral adjustment is affected by both the track of the tractor, the tyre dimension of the tractor and the ploughing width of the plough. For a semi-mounted plough or a trailed plough, such lateral adjustment is desirable also because of the fact that there is a varying need with respect to where the tractor should be positioned relative to the edge of the unploughed field. The lateral adjustment is performed mechanically or hydraulically during ploughing, and it is typically effected by the frame of the plough being displaced laterally relative to the plough's tower or drawbar, to which the tractor is connected.

Many ploughs are equipped with devices for adjusting the ploughing width, that is to say the working width of each individual plough body. The applicant's own system is known under the names Van-Width® and Variomat®. When some versions of plough with such working-width adjustment are to be adjusted, the tractor driver must operate both the cylinder for working-width adjustment (to adjust the transverse spacing of the plough bodies) and the cylinder for displacing the plough laterally relative to the tower or the drawbar (to adjust the distance between the inside of the rear tractor wheel and the landside of the first plough body). This makes the working-width adjustment complicated, and there is a risk that the ploughing result will not be an optimum one, by the lateral displacement not giving the same ploughing width for the first plough body as for the subsequent ones.

SUMMARY

The invention has for its object to remedy or reduce at least one of the drawbacks of the prior art or at least provide a useful alternative to the prior art.

The object is achieved through features, which are specified in the description below and in the claims that follow.

The invention provides a device for automatically adjusting the working width of the first plough body in accordance with the variable working width of the subsequent plough bodies, a first hydraulic cylinder, which is arranged to adjust a plough frame laterally relative to a tower or a drawbar forming a connection between a tractor and the plough frame, being formed as a two-stage, telescopic hydraulic cylinder, in which a first cylinder stage, that is to say a first piston rod with a piston, is connected to a first hydraulic circuit and is used for a primary adjustment of the lateral displacement of the plough frame. A second cylinder stage, that is to say a second piston rod with a piston, is arranged in the first piston rod and connected to a second hydraulic circuit, wherein a second hydraulic cylinder, which is arranged for working-width adjustment, that is to say an adjustment of a transverse spacing of the plough bodies, alternatively via a control valve for, for example, reversing a reversible plough, is arranged in a master-slave configuration, the second cylinder stage of the first hydraulic cylinder and the second hydraulic cylinder alternately being the master and the slave according to the direction in which the plough is adjusted. Stroke volumes for the instroke and outstroke of the master/slave cylinder stages have been matched to each other so that an adjustment of the working width with the second hydraulic cylinder gives an automatic correction of the lateral displacement of the plough frame, that is to say the working width of the first plough body, by means of the second cylinder stage of the first hydraulic cylinder.

The piston of the second cylinder stage of the first hydraulic cylinder preferably includes a first by-pass valve that, from a position near the bottom abutment onwards, opens for oil to be drained from a piston side to a piston-rod side. This ensures that a possible oil leakage to the piston side will not change the position relationship between the second cylinder stage of the first hydraulic cylinder and the second hydraulic cylinder. In the same way, the piston of the second hydraulic cylinder is provided with a second by-pass valve.

The second hydraulic cylinder may be provided with a separate memory piston which, by means of a third hydraulic circuit, forms a displaceable bottom abutment in said hydraulic cylinder, in order thereby to set a parameter which is important for the ploughing operation, for example an operational largest ploughing width.

The invention relates, more specifically, to a device for automatically adjusting the working width of the first plough body of a plough in accordance with the variable working width of subsequent plough bodies, in which a first hydraulic cylinder is arranged to displace a rear frame section laterally relative to a front frame section, and a second hydraulic cylinder is arranged to pivot the rear frame section around a first vertical pivoting axis in order thereby to adjust a transverse spacing of the plough bodies by the plough bodies pivoting around second vertical pivoting axes, characterized by the first hydraulic cylinder being a multi-stage cylinder in which a first cylinder stage forms a main lateral control, and a second cylinder stage forms an automatic working-width control for the first plough body, the second cylinder stage being in hydraulic-fluid communication with the second hydraulic cylinder in a master-slave configuration, the second cylinder stage being the master or the slave depending on the moving direction of the cylinder stage, and the second hydraulic cylinder correspondingly being the slave or the master, and the piston diameters of the second cylinder stage and the second hydraulic cylinder being matched to each other so that an adjustment of the working width of the plough bodies by the second hydraulic cylinder provides a correction of the lateral displacement of the front frame section.

A piston of the second cylinder stage of the first hydraulic cylinder may include a first by-pass valve, which, from a position near the bottom abutment of the piston onwards, opens for oil to be drained from a piston side to a piston-rod side.

A piston of the second hydraulic cylinder may include a second by-pass valve, which, from a position near the bottom abutment of the piston onwards, opens for oil to be drained from a piston side to a piston-rod side.

The second hydraulic cylinder may include a separate memory piston forming a hydraulically displaceable bottom abutment.

The plough may be a reversible plough, and the piston-rod sides of the second cylinder stage of the first cylinder and of the second cylinder may be interconnected via a turnover sequence valve for synchronizing the reversing of the plough with the adjustment of the working width of the plough to a minimum.

BRIEF DESCRIPTION OF THE DRAWINGS

In what follows, an example of a preferred embodiment is described, which is visualized in the accompanying drawings in which.

DETAILED DESCRIPTION

Figure 1:
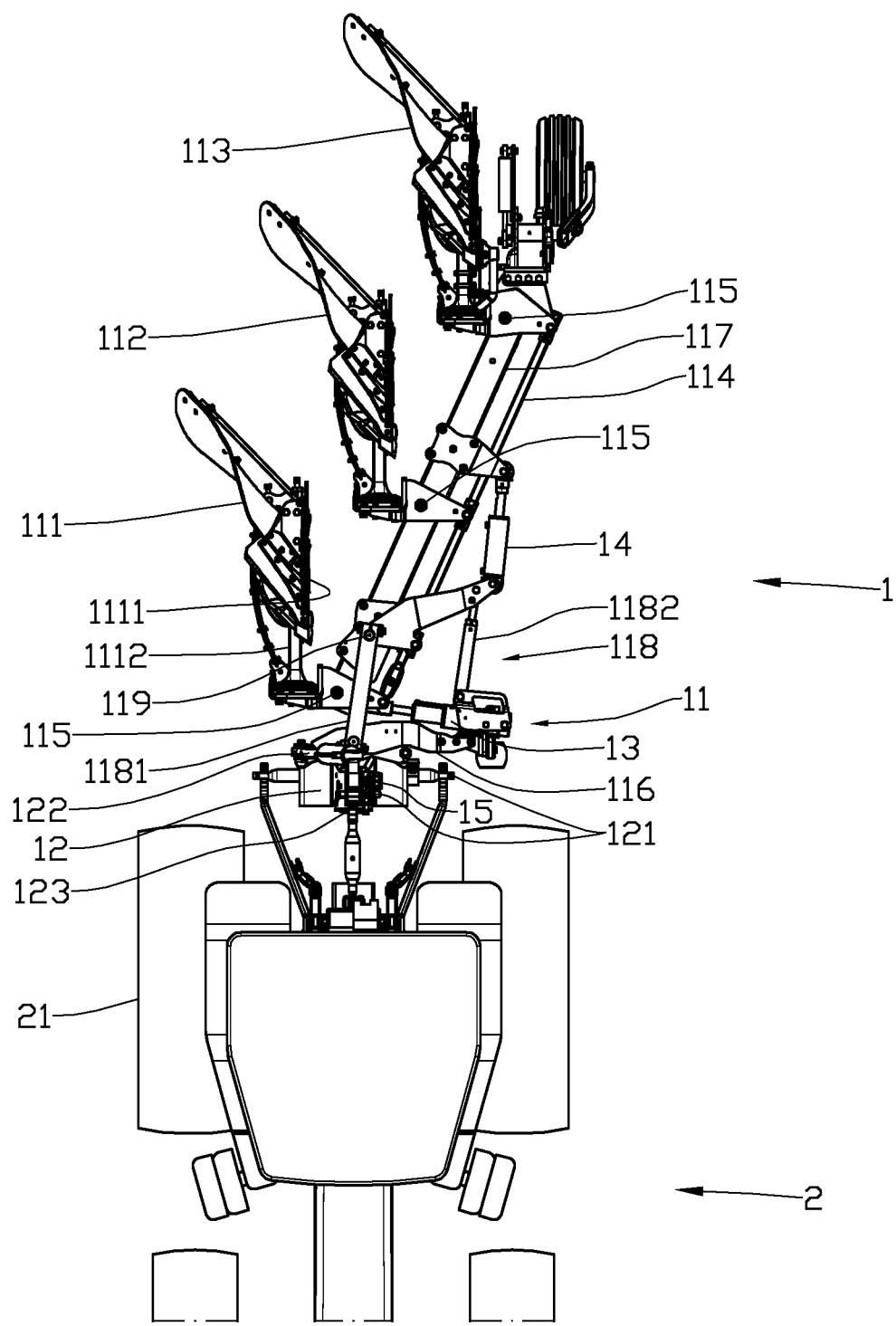
FIG. 1 shows a plough, more particularly a reversible plough, with a variable ploughing width, connected to a tractor and provided with a device for automatically adjusting the working width of the first plough body.

Reference is first made to FIG. 1, in which a plough, shown here as a 3-furrow reversible plough is indicated by the reference numeral 1. The plough 1 includes a plough frame 11 and a tower 12, the plough frame 11 and the tower 12 being rotatably connected around a horizontal axis by means of a so-called headstock 123. The reversing of the reversible plough 1 is carried out by means of a turnover cylinder 122, which is connected between a front frame section 116 and the tower 12.

Several plough bodies 111, 112, 113 are attached to a rear frame section 117. The rear frame section 117 is laterally displaceable relative to the front frame section 116 and the tower 12 in order to adjust the working width of a first plough body 111 to the track width and tyre width of a connected tractor, so that the distance between the inside of a rear wheel 21 of the tractor 2 and a landside 1111 of the first plough body 111 is in accordance with the working width of the other plough bodies 112, 113. The lateral displacement is provided by means of a first hydraulic cylinder 13 that, together with a lateral-displacement section 118, shown here as two parallel rods 1181, 1182, forms a connection between the front and rear frame sections 116, 117.

By means of a second hydraulic cylinder 14, the rear frame section 117 is pivotal around a first vertical pivoting axis 119 arranged in the connection between the front and rear frame sections 116, 117. The beam 1112 of each plough body 111, 112, 113 is attached to the rear frame section 117, pivotal around a second vertical pivoting axis 115 and is connected to a parallel rod 114 which is anchored to the front frame section 116 via the lateral-displacement section 118. When the rear frame section 117 is pivoted, the plough bodies 111, 112, 113 pivot around their vertical pivoting axes 115, and the spacing of the plough bodies 111, 112, 113 changes, with the result that the working width of the plough 1 is being changed.

Figure 2:
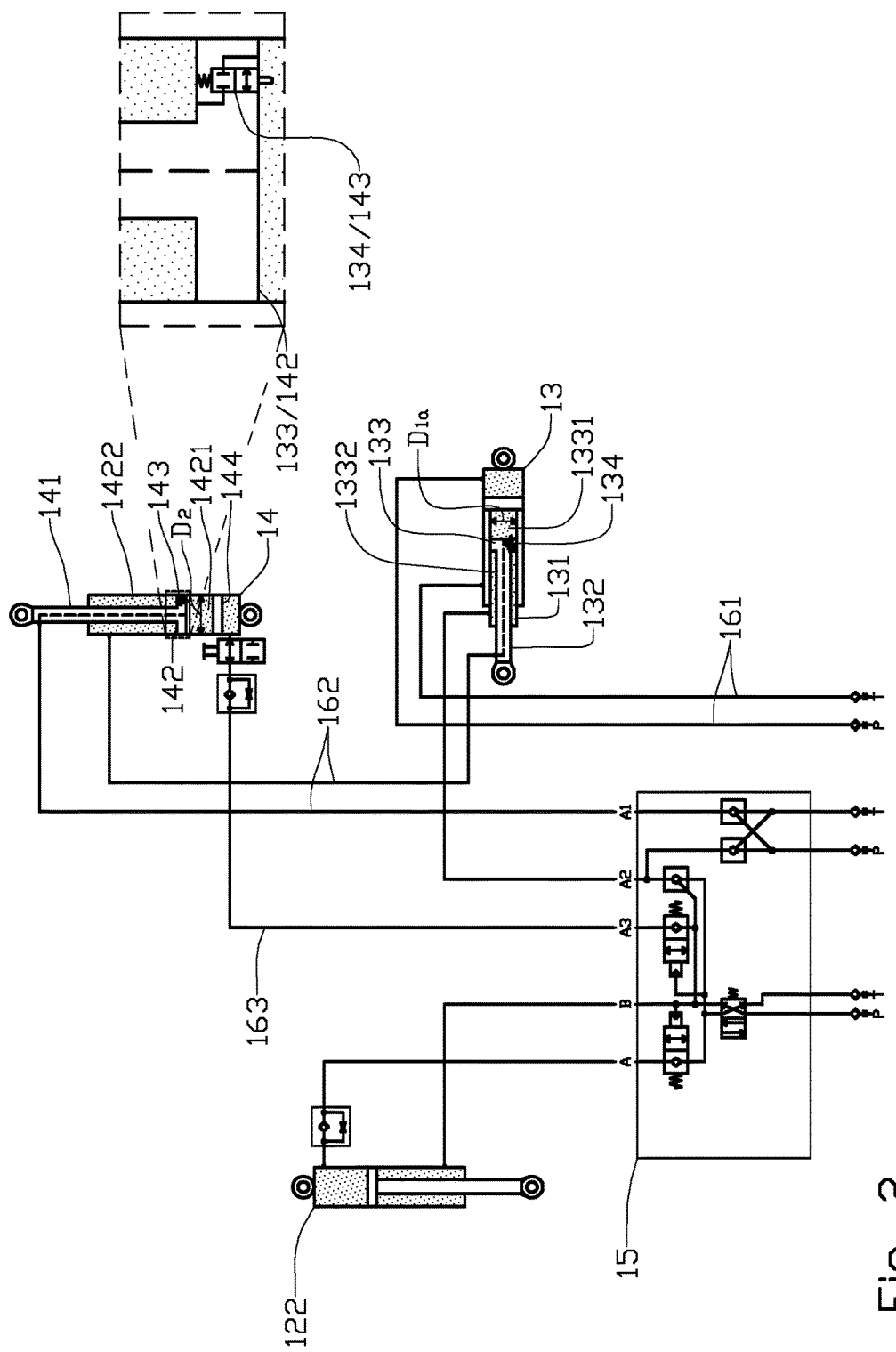
FIG. 2 shows a hydraulics diagram, on a larger scale, showing the hydraulic cylinder arrangement according to the invention in greater detail.

Reference is now made to FIG. 2 in particular. The first hydraulic cylinder 13 includes two cylinder stages, a first cylinder stage 131, which is used for the main adjustment of the lateral position of the rear frame section 117 relative to the front frame section 116 and is connected to a first hydraulic circuit 161, accommodating a second cylinder stage 132, which is connected via a second hydraulic circuit 162 to the second hydraulic cylinder 14, piston side 1331 to piston-rod side 1422, piston-rod side 1332 to piston side 1421 via a control valve 15 which, for a reversible plough, is typically a turnover sequence valve, the second cylinder stage 131 and the second hydraulic cylinder 14 cooperating in a master-slave arrangement.

The piston diameter $D_{1a}$ of the second cylinder stage 132 and the piston diameter $D_2$ of the second hydraulic cylinder 14 have been matched to each other in such a way that when the working width of the plough 1 is adjusted by the second hydraulic circuit 162, the rear frame section 117 is correspondingly adjusted sideways, account having been taken, in the dimensioning of the cylinders 13, 14, of the geometry of the lateral-displacement section 118, the distance between the pivoting axis 115 of the first plough body 111 and the pivoting axis of the rear frame section 117 and so on.

The second hydraulic cylinder 14 is shown here with a separate piston 144, also called a memory piston, arranged in the volume between the bottom of the hydraulic cylinder 14 and an ordinary piston 142 arranged on a piston rod 141. A cylinder volume between the bottom of the cylinder and the separate piston 144 is in fluid communication with the control valve 15 via a third hydraulic circuit 163. The memory piston 144 forms a displaceable bottom abutment in said hydraulic cylinder 14, in order thereby to set a parameter, which is important for a ploughing operation, typically an operational largest ploughing width.

Both the second cylinder stage 132 in the first hydraulic cylinder 13 and the second hydraulic cylinder 14 are provided with a by-pass valve 134, 143, also termed a resetting valve, arranged in a piston 133, 142, respectively, in such a way that when said piston 133, 142 is near its bottom abutment, the by-pass valve 134, 143, respectively, opens for oil to flow through between a piston side 1331, 1421, respectively, and a piston side 1331, 1422, respectively, to ensure that both pistons 133, 142 will reach their starting positions unaffected by a possible oil leakage past the piston 133, 142 to the piston side 1331, 1421 of the piston.

The invention claimed is:

1. A device for automatically adjusting the working width of the first plough body of a plough in accordance with the variable working width of subsequent plough bodies, comprising:

a first hydraulic cylinder is configured to displace a rear frame section laterally relative to a front frame section, and a second hydraulic cylinder is configured to pivot the rear frame section around a first vertical pivoting axis in order to adjust a transverse spacing of the first and subsequent plough bodies by the first and subsequent plough bodies pivoting around second vertical pivoting axes, wherein the first hydraulic cylinder comprises a multi-stage cylinder in which a first cylinder stage forms a main lateral control, and a second cylinder stage forms an automatic working-width control for the first plough body, the second cylinder stage is in hydraulic-fluid communication with the second hydraulic cylinder in a master-slave configuration, the second cylinder stage being a master or a slave depending on a moving direction of the second cylinder stage and the second hydraulic cylinder correspondingly being the slave or the master, and piston diameters of the second cylinder stage and the second hydraulic cylinder are matched to each other so that an adjustment of the transverse spacing for the first and subsequent plough bodies by the second hydraulic cylinder provides a correction of the lateral displacement of the front frame section.

2. The device in accordance with claim 1, wherein a piston of the second cylinder stage of the first hydraulic cylinder includes a first by-pass valve which, from a position near a bottom abutment of the piston onwards, opens for oil to be drained from a piston side to a piston-rod side.

3. The device in accordance with claim 1, wherein a piston of the second hydraulic cylinder includes a second by-pass valve which, from a position near a bottom abutment of the piston onwards, opens for oil to be drained from a piston side to a piston-rod side.

4. The device in accordance with claim 1, wherein the second hydraulic cylinder includes a separate memory piston forming a hydraulically displaceable bottom abutment.

5. The device in accordance with claim 1, wherein the plough is a reversible plough, and the piston-rod sides of the second cylinder stage and of the second hydraulic cylinder are interconnected by a turnover sequence valve for synchronizing the reversing of the plough with the adjustment of the working width of the plough to a minimum.

\* \* \* \* \*